J. G. VINCENT.

MOTOR VEHICLE.

APPLICATION FILED OCT. 8, 1917.

Reissued Mar. 5, 1918. 14,441.

Inventor:
Jesse G. Vincent;
By Milton Tibbetts,
Atty.

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

14,441. Specification of Reissued Letters Patent. Reissued Mar. 5, 1918.

Original No. 1,157,068, dated October 19, 1915, Serial No. 732,942, filed November 22, 1912. Application for reissue filed October 8, 1917. Serial No. 195,483.

*To all whom it may concern:*

Be it known that I, JESSE G. VINCENT, a citizen of the United States, and resident of Detroit, Wayne county, State of Michigan, have invented certain new and useful Improvements in Motor-Vehicles, of which the following is a specification.

This invention relates to motor vehicles, and particularly to the transmission or driving mechanism thereof.

One of the objects of the invention is to embody a reduction gearing in the hub of the driving wheel.

Another object of the invention is to provide a motor vehicle with a planetary gearing mounted in the driving wheel hub and adequately housed therein.

Other objects of the invention will appear from the following description, taken in connection with the drawings which form a part of this specification, and in which:—

Figure 1:
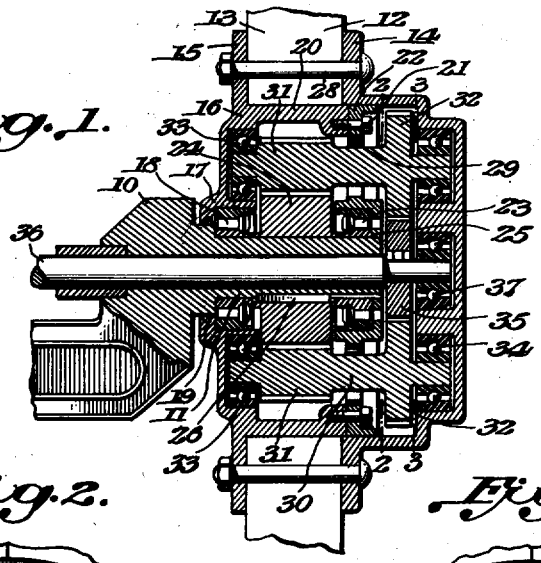
Figure 1 is a vertical section through a motor vehicle axle and the wheel mounted thereon.
Figure 2:
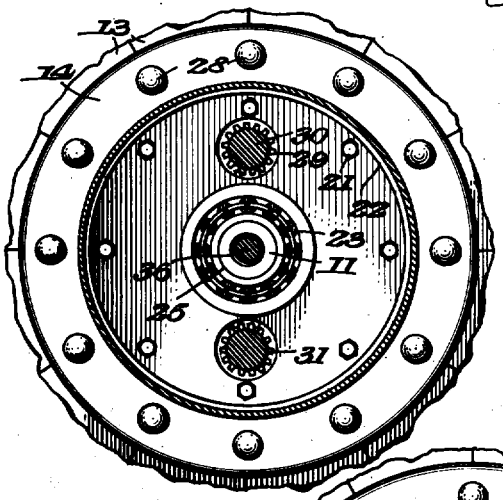
Fig. 2 is a section substantially on the line 2—2 of Fig. 1.
Figure 3:
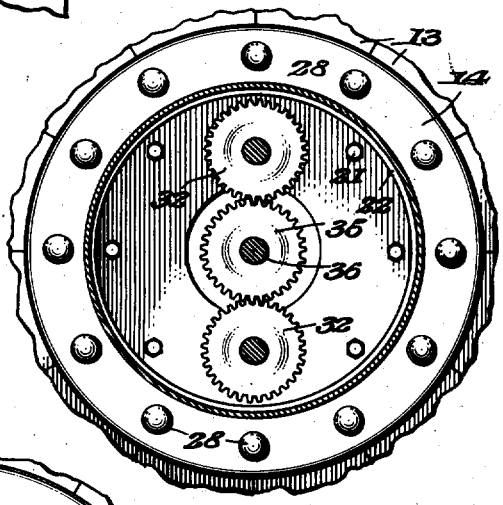
Fig. 3 is a section substantially on the line 3—3 of Fig. 1.
Figure 4:
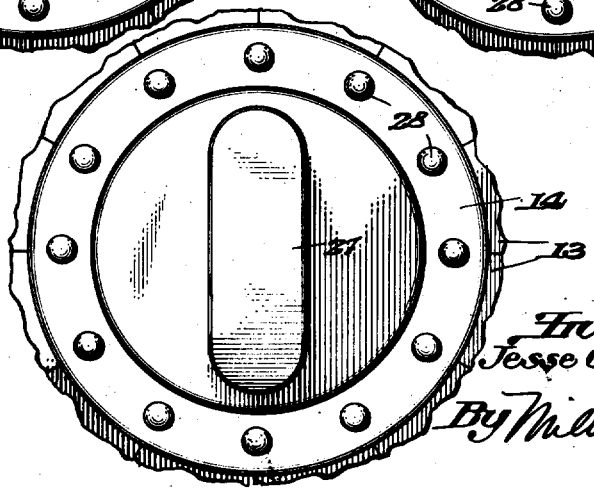
Fig. 4 is an end view of the wheel.

Referring to the drawings, 10 represents one of the vehicle supporting axles having a spindle part 11, upon which the wheel 12 is adapted to rotate. The wheel comprises spokes 13 secured between the flanges 14 and 15 of the hub. The inner part 16 of the hub, besides having the flange 15, has an inwardly extending flange 17, in which the roller bearing 18 is mounted. This bearing also fits on the spindle 11, whereby the wheel is supported on the spindle. The flange 17 is also extended somewhat around the bearing 18 and makes a running joint with the spindle 11, as at 19.

The part 16 of the hub is also formed with a cylindrical portion 20, against which the inner ends of the spokes 13 abut, and secured to the outer end of this cylindrical portion, as by bolts 21, is a disk member 22, in the inner part of which is a bearing 23, also supported on the spindle 11 but separated somewhat from the bearing 18, as shown particularly in Fig. 1.

A spur gear 24 separates the bearings 18 and 23, and a securing nut 25 holds the bearings and gear in place on the spindle 11. The gear 24 is preferably keyed to the spindle 11, as shown at 26.

The flange 14, hereinabove referred to, forms a part of the outer end wall 27 of the hub, and this part of the hub is secured to the part 16 thereof by means of a series of bolts 28. Thus the parts 16 and 27 form inner and outer end walls, respectively, of the hub, and the disk member 22 forms an intermediate wall, the wheel bearings being mounted in the inner end wall and the intermediate wall, as hereinabove described.

The disk member 22 is formed with a series of holes 29, through which pass the shafts 30 and two pairs of planetary gears 31 and 32, these gears being shown as integral with their shafts, and the ends of the shafts being mounted in bearings 33 and 34 in the inner and outer end walls respectively. The gears 31 are mounted to constantly mesh with the gear 24, and the gears 32 constantly mesh with a gear 35 mounted in bearings 37 in the outer end wall 27. This shaft 36 extends axially through the spindle 11 and is suitably connected with the motor through mechanism, not shown.

From the above description, it will be understood that the driving shaft 36 turns the gear 35, which in turn transmits motion to the shaft 30, and by reason of the gear 31 meshing with the gear 24, the shaft 30 is bodily rotated around the axis of the spindle 11 and thereby carrying with it the entire wheel 12.

It will be seen that the flange 17 extends inwardly to a point adjacent the spindle 11, and the outer wall 27 completely incloses the gears at that end, so that lubricant is easily retained in the casing thus formed within the hub and inclosing the gears.

Various modifications of the invention may be made without departing from the spirit thereof, and all such modifications and mechanical equivalents are intended to be included in the claims.

Having thus described my invention, what I claim and desire to secure by Letters Patent is:—

1. In a motor vehicle, the combination with the supporting axle, of a wheel having a hub mounted on supporting bearings on said axle, gears in the hub connecting the wheel and axle, some of said gears being offset from the wheel axis and being adapted to rotate with the wheel and about their own axes, and a driving shaft extending through the axle and connected to said gears.

2. In a motor vehicle, the combination with the supporting axle, of a wheel supported on bearings and adapted to rotate thereon, gears mounted in the wheel to rotate therewith and on their own axes and connected to operate the wheel, and a driving shaft extending through the axle and connected to said gears.

3. In a motor vehicle, the combination with the supporting axle, of a wheel supported on bearings and adapted to rotate thereon, a gear secured to the axle, planetary gears carried by the wheel and in mesh with said gear, and a driving shaft extending through the axle and connected to said planetary gears.

4. In a motor vehicle, the combination with the supporting axle, of a wheel supported on bearings and adapted to rotate thereon, planetary reduction gears connected to the axle and wheel, and a driving shaft extending through the axle and connected to operate the planetary gears.

5. In a motor vehicle, the combination with the axle having a spindle, of a wheel having a hub mounted on spaced bearings on said spindle, a gear secured to the spindle between said bearings, a pair of gears mounted in said hub, with one of the pair in mesh with the first said gear, a driving shaft extending into the hub, a gear on said shaft in mesh with the other gear of said pair, and means on the wheel for housing all of said gears.

6. In a motor vehicle, the combination with the axle, of a wheel having a hub comprising inner and outer end walls and an intermediate wall, bearings between two of said walls, and the axle for supporting the wheel on the axle, gears mounted in the end walls of the hub, a driving shaft, means connecting said gears and said axle, and means connecting said driving shaft and said gears.

7. In a motor vehicle, the combination with the axle, of a wheel having a hub comprising inner and outer end walls and an intermediate wall, said intermediate wall being detachably secured to a flange on one of said end walls, bearings between the axle and the inner end and intermediate walls for supporting the wheel on the axle, gears mounted in the end walls and extending through openings in the intermediate wall, a gear on the axle in mesh with one of said gears, a driving shaft having a bearing in the outer end wall, and a gear on said shaft in mesh with the other of said gears.

8. In a motor vehicle, in combination, an axle or stationary element and a wheel or rotating element, spaced bearings on the axle rotatively supporting the wheel thereon, a gear rigidly connected to one of said elements intermediate said spaced bearings and concentric therewith, a casing on the other of said elements extending on both sides of said gear and making a running joint at one side of said gear with the element to which said gear is connected whereby lubricant is retained in the casing above the lowest point of said gear, a driving shaft supported by the axle and extending into said casing, and a gear on said shaft within said casing and coöperating with said first mentioned gear to rotate the wheel on its bearings.

9. In a motor vehicle, in combination, an axle or stationary element and a wheel or rotating element, spaced bearings on the axle rotatively supporting the wheel thereon, a gear rigidly connected to the axle intermediate said spaced bearings and concentric therewith, a casing formed on the wheel and extending on both sides of said gear and making a running joint with the axle at one side of said gear whereby lubricant is retained in the casing above the lowest point of said gear, a driving shaft supported by the axle and extending into said casing, and a gear on said shaft within the casing operatively connected with said first mentioned gear to rotate the wheel on its bearings.

10. In a motor vehicle, in combination, an axle or stationary element and a wheel or rotating element, bearings on the axle for rotatively supporting the wheel thereon, a gear rigidly connected to one of said elements concentrically with the axis of rotation of said wheel, a second gear in mesh with the first gear and mounted parallel to and offset from the axis of the first gear, one of said gears being mounted to rotate bodily with the wheel, a casing on one of said elements extending on both sides of the gears and making a running joint with the other of said elements at one side of said gears whereby lubricant is retained in the casing above the lowest point of the rigidly connected gear, and a driving shaft supported by the axle and extending into said casing and operatively connected to said second gear to rotate the wheel on its bearings.

11. In a motor vehicle, in combination, an axle or stationary element and a wheel or rotating element, bearings on the axle for rotatively supporting the wheel thereon, a gear rigidly connected to one of said elements concentrically with the axis of rotation of said wheel, a casing on one of said elements extending on both sides of said gear and making a running joint with the other of said elements at one side of said gear whereby lubricant is retained in the casing above the lowest point of said gear, a second gear in mesh with the first gear and mounted to rotate in bearings in said casing and having its axis parallel to and offset from the axis of the first gear, one of said gears being mounted to rotate bodily with the wheel, and a driving shaft supported by the axle and extending into said casing and operatively connected to said second gear to rotate the wheel on its bearings.

12. In a motor vehicle, the combination with the supporting axle, of a wheel having a hub mounted on supporting bearings on said axle, gears in the hub connecting the wheel and axle, some of said gears having a compound motion including movement of their axes about the wheel axis and a rotary movement about their own axes, and a driving shaft extending through the axle and connected to said gears.

In testimony whereof I affix my signature.

JESSE G. VINCENT.